US012806718B2

(12) United States Patent
Clare et al.

(10) Patent No.: US 12,806,718 B2
(45) Date of Patent: Nov. 24, 2026

(54) REPAIR SYSTEM AND METHOD FOR IN-SITU REPAIR OF MACHINE

(71) Applicant: ROLLS-ROYCE plc, London (GB)

(72) Inventors: Adam Clare, Nottingham (GB); Andres A. Gameros Madrigal, Nottingham (GB); James Kell, Nottingham (GB); Andrew D. Norton, Derby (GB); Thomas Girerd, Nottingham (GB)

(73) Assignee: Rolls-Royce plc, London (GB)

( * ) Notice: Subject to any disclaimer, the term of this patent is extended or adjusted under 35 U.S.C. 154(b) by 746 days.

(21) Appl. No.: 18/322,916

(22) Filed: May 24, 2023

(65) Prior Publication Data

US 2023/0398632 A1 Dec. 14, 2023

(30) Foreign Application Priority Data

Jun. 13, 2022 (GB) ...................................... 2208609

(51) Int. Cl.

*B23K 26/26* (2014.01)
*B23P 6/00* (2006.01)

(Continued)

(52) U.S. Cl.

CPC ................ *B23K 26/26* (2013.01); *B23P 6/00* (2013.01); *B23K 26/082* (2015.10); *B23K 26/1464* (2013.01); *B23K 2101/001* (2018.08)

(58) Field of Classification Search

CPC ............ B23K 2101/001; B23K 26/082; B23K 26/1464; B23K 26/26; B23K 26/342; B23K 35/0255; B23P 6/00; B23P 6/005

See application file for complete search history.

(56) References Cited

U.S. PATENT DOCUMENTS 5,143,275 A 9/1992 Hara et al.
5,454,925 A 10/1995 Garland et al.

(Continued)

FOREIGN PATENT DOCUMENTS

CA 2545863 A1 2/2007
CN 107313813 A 11/2017

(Continued)

OTHER PUBLICATIONS

Great Britain search report dated Dec. 7, 2022, issued in GB Patent Application No. 2208609.4.

(Continued)

*Primary Examiner* — John J Norton
*Assistant Examiner* — Dilnessa B Belay

(57) ABSTRACT

A repair system for in-situ repair of a machine. The repair system includes a laser unit configured to emit a laser beam, a galvanometer optically coupled to the laser unit and configured to adjust the laser beam received from the laser unit, a source of a flexible metallic mesh, a delivery unit configured to receive the flexible metallic mesh from the source of the flexible metallic mesh, and a controller communicably coupled to the laser unit, the galvanometer, and the delivery unit. The controller is configured to control the delivery unit to deposit the flexible metallic mesh on a surface of the machine. The controller is further configured to control the laser unit to emit the laser beam and to control the galvanometer to adjust the laser beam in order to weld the flexible metallic mesh to the surface of the machine, thereby forming a repair patch.

10 Claims, 13 Drawing Sheets

(51) Int. Cl.

| | |
|---|---|
| *B23K 26/082* | (2014.01) |
| *B23K 26/14* | (2014.01) |
| *B23K 101/00* | (2006.01) |

(56) References Cited

U.S. PATENT DOCUMENTS

| | | | | |
|---|---|---|---|---|
| 6,118,098 | A | 9/2000 | Amos et al. | |
| 6,905,728 | B1 | 6/2005 | Hu et al. | |
| 2002/0117485 | A1* | 8/2002 | Jones | B23K 26/60 219/121.64 |
| 2004/0191064 | A1 | 9/2004 | Guo | |
| 2005/0224485 | A1* | 10/2005 | Matiash | B23K 26/211 219/137.7 |
| 2006/0137179 | A1 | 6/2006 | Gorman et al. | |
| 2010/0034982 | A1* | 2/2010 | Fuwa | B33Y 70/00 419/5 |
| 2010/0061846 | A1 | 3/2010 | Herbst et al. | |
| 2011/0150636 | A1 | 6/2011 | Tholen et al. | |
| 2012/0318437 | A1 | 12/2012 | Dagenais | |
| 2015/0224598 | A1 | 8/2015 | Giorni et al. | |
| 2017/0239762 | A1 | 8/2017 | Roberts et al. | |
| 2024/0297313 | A1* | 9/2024 | Dommann | B23K 26/144 |

FOREIGN PATENT DOCUMENTS

| | | | |
|---|---|---|---|
| DE | 202008016358 | U1 | 2/2009 |
| JP | 2008184622 | A2 | 8/2008 |

OTHER PUBLICATIONS

European search report dated Dec. 5, 2023, issued in EP Patent Application No. 23173833.7.

* cited by examiner

REPAIR SYSTEM AND METHOD FOR IN-SITU REPAIR OF MACHINE

CROSS-REFERENCE TO RELATED APPLICATIONS

This specification is based upon and claims the benefit of priority from United Kingdom patent application number GB 2208609.4 filed on Jun. 13, 2022, the entire contents of which is incorporated herein by reference.

BACKGROUND

Technical Field

The present disclosure generally relates to in-situ repair of a machine, and in particular to a repair system and a method of in-situ repair of a machine.

Description of the Related Art

A machine, for example, a gas turbine engine, requires in-situ repair of one or more components of the machine that are usually damaged after numerous working cycles of the machine. In other words, after some work operations of the machine, the machine may be damaged due to defects, such as cracks and irregularities on the one or more surfaces of the machine. Further, such damaged surfaces/portions need to be repaired before further use of the machine in order to maintain an appropriate efficiency of the machine and to avoid any accidents associated with the machine and its users.

Conventionally, in some cases, in-situ repair of the machine may be performed by using laser cladding of metallic powder (i.e., laser cladding with powdered filler). However, laser cladding of metallic powder may be complicated to develop for in-situ applications, such as in-situ repair of the machine. Further, about 30% to 40% of the metallic powder may be wasted during a repair cycle. Moreover, the metallic powder used in laser cladding is highly explosive and needs to be collected after the repair cycle. Thus, collection of the metallic powder after the repair cycle is important to avoid any potential danger due to explosive nature of the metallic powder. Therefore, in-situ repair of the machine by using laser cladding of metallic powder may be inefficient and time consuming.

Another conventional technique for in-situ repair of the machine is laser cladding of wire (i.e., laser wire deposition) on the one or more damaged surfaces of the machine. However, the laser wire deposition process for in-situ applications may be limited by a size of the wire. As a result, a repair operation may slow down. In addition, the laser wire deposition process may not allow metal patches to be applied on the one or more damaged surfaces of the machine. Further, laser cladding of machining chips may not also be suitable for in-situ repair of the machine.

Another conventional technique for in-situ repair of the machine is laser cladding of strips with diffractive optic lenses (DOLs). However, using the DOLs may result in generation of large melt pools thereby causing a significant heat distortion on the one or more damaged surfaces of the machine.

Another conventional technique for in-situ repair of the machine is cold spraying. However, a material efficiency of the cold spraying process is about 80%. For in-situ applications, only micro cold spray nozzles may be suitable for use. However, the material efficiency of the micro cold spray nozzles is about only 60%. Moreover, materials used with such micro cold spray nozzles are also limited. Therefore, cold spraying may not be a suitable technique for in-situ repair of the machine.

In some applications, composite patches are used for in-situ repairing of cracks and other defects that are developed on a damaged surface of the machine. However, the composite patches may not be suitable for high stress conditions, such as wet environment or high temperature applications. Therefore, there exists a need for a system and/or a method for in-situ repair of a machine which overcomes the aforementioned limitations.

SUMMARY

According to a first aspect there is provided a repair system for in-situ repair of a machine. The repair system includes a laser unit configured to emit a laser beam. The repair system further includes a galvanometer optically coupled to the laser unit and configured to adjust the laser beam received from the laser unit. The repair system further includes a source of a flexible metallic mesh. The repair system further includes a delivery unit configured to receive the flexible metallic mesh from the source of the flexible metallic mesh. The repair system further includes a controller communicably coupled to the laser unit, the galvanometer, and the delivery unit. The controller is configured to control the delivery unit to deposit the flexible metallic mesh on a surface of the machine. The controller is further configured to control the laser unit to emit the laser beam. The controller is further configured to control the galvanometer to adjust the laser beam in order to weld the flexible metallic mesh to the surface of the machine, thereby forming a repair patch.

As compared to a conventional in-situ repair technique involving powder-based deposition process, the repair system of the present disclosure involves the deposition of the flexible metallic mesh on the surface of the machine. Further, in contrast to discontinuous feed of metallic powder in the powder-based deposition process, the repair system of the present disclosure provides continuous supply and deposition of the flexible metallic mesh on the surface of the machine. Hence, the continuous deposition of the flexible metallic mesh on the surface of the machine may provide a relatively improved efficiency of the in-situ repair of the machine.

Furthermore, contrary to conventional techniques of in-situ repair, a wastage of the flexible metallic mesh in the repair system of the present disclosure may be reduced effectively or eliminated. Moreover, the repair system using the flexible metallic mesh may be relatively easier to design and use for in-situ repair of the machine.

The delivery unit of the repair system may allow deposition of the flexible metallic mesh of any shape and size to repair the surface of the machine. As the controller is configured to control the galvanometer to adjust various optical characteristics (focal point, trajectory, intensity) of the laser beam, a desirable repair patch may be formed on the surface of the machine in accordance with different application requirements. Further, as the controller is configured to control the laser unit to emit the laser beam, the energy produced by the laser beam to melt the surface of the machine and the flexible metallic mesh may also be adjusted based on different application requirements. In other words, the repair system may control a grain orientation of a microstructure of a weld area on the surface of the machine. Specifically, the laser unit may be controlled such that a large melt pool (larger than a diameter of the laser beam) can be generated at a very high temperature to achieve a columnar microstructure of the material of the machine and the flexible metallic mesh, or at a lower temperature to achieve an equiaxed microstructure of the material of the machine and the flexible metallic mesh. Therefore, the repair system of the present disclosure provides a fully customisable technique for complex in-situ repair operations of one or more damaged surfaces of the machine.

In some other cases, when a large flexible metallic mesh is to be deposited on the surface of the machine, plasma welding or electric arc welding may also be used in order to perform in-situ repair of the machine. In such cases, deposition of the large flexible metallic mesh may be faster and easier.

In some embodiments, the repair system further includes a shielding unit configured to emit a shielding gas. The surface of the machine and the flexible metallic mesh are melted during laser welding. The shielding gas may prevent exposure of the melted surface of the machine and the melted flexible metallic mesh to oxygen, nitrogen and hydrogen contained in the air atmosphere.

In some embodiments, the repair system further includes a nozzle disposed in fluid communication with at least the shielding unit. The nozzle is configured to receive the shielding gas from the shielding unit and spray the shielding gas on the surface of the machine. The nozzle may provide a controlled delivery of the shielding gas from the shielding unit to the surface of the machine. Specifically, the nozzle may adjust the amount of the shielding gas sprayed on the surface of the machine.

In some embodiments, the nozzle is further disposed in fluid communication with the delivery unit. The nozzle is further configured to receive the flexible metallic mesh from the delivery unit and deposit the flexible metallic mesh on the surface of the machine. Thus, the nozzle is configured to receive the shielding gas from the shielding unit as well as the flexible metallic mesh from the delivery unit. Further, the same nozzle is configured to spray the shielding gas as well as deposit the flexible metallic mesh on the surface of the machine. This may result in a compact and simple design of the repair system.

In some embodiments, the delivery unit includes a duct including a passage disposed in fluid communication with the shielding unit and the source of the flexible metallic mesh. The duct is configured to receive therein the shielding gas from the shielding unit and the flexible metallic mesh from the source of the flexible metallic mesh. The delivery unit further includes a pair of rollers configured to receive therebetween the flexible metallic mesh from the duct. The pair of rollers is configured to rotate opposite to each other to deposit the flexible metallic mesh on the surface of the machine. The delivery unit further includes a power source drivably coupled to the pair of rollers and communicably coupled to the controller. The power source is configured to rotate the pair of rollers. The controller is configured to control the power source in order to rotate the pair of rollers opposite to each other. The delivery unit further includes a spray nozzle disposed in fluid communication with the duct and configured to spray the shielding gas on the surface of the machine. As the spray nozzle is a part of the delivery unit, the repair system may have a compact design. As a result, there may be minimal constraints related to space requirements in the repair system. Further, since the same duct is used for transporting the shielding gas as well as the flexible metallic mesh, the repair system may have a compact and simple design.

In some embodiments, the delivery unit further includes a pair of clamping members. Each of the pair of clamping members is coupled to a corresponding roller from the pair of rollers. The delivery unit further includes one or more fasteners connecting the pair of clamping members to each other. The one or more fasteners are configured to adjust a force applied by the pair of rollers on the flexible metallic mesh. Each of the duct and the spray nozzle is at least partially received within one of the pair of clamping members. The one or more fasteners may adjust an amount of the flexible metallic mesh supplied by the pair of rollers by adjusting the force applied by the pair of rollers on the flexible metallic mesh. Further, since the duct and the spray nozzle are at least partially received within one of the pair of clamping members, the repair system may have a compact design.

In some embodiments, the repair system further includes a delivery nozzle disposed in fluid communication with the delivery unit. The delivery nozzle is configured to receive the flexible metallic mesh from the delivery unit and deposit the flexible metallic mesh on the surface of the machine. The delivery nozzle may provide a controlled delivery of the flexible metallic mesh from the delivery unit to the surface of the machine. Specifically, the delivery nozzle may adjust an amount of the flexible metallic mesh deposited on the surface of the machine.

In some embodiments, the controller is communicably coupled to the shielding unit. The controller is further configured to control the shielding unit in order to emit the shielding gas from the shielding unit. Specifically, the controller may conveniently enable or disable the shielding unit in order to emit or stop the shielding gas from the shielding unit, based on an algorithm or a set of instructions stored in the controller.

In some embodiments, the repair system further includes a coating unit configured to coat the repair patch with one or more ceramic materials to form a thermal barrier repair patch. The one or more ceramic materials may prevent the repair patch from any damage.

In some embodiments, the repair system further includes a cleaning unit configured to perform at least one of cleaning, pre-machining, and degreasing of the surface of the machine prior to depositing the flexible metallic mesh on the surface of the machine. The cleaning unit may facilitate in cleaning oxides and grease and removing unwanted portions from the surface of the machine to improve the quality of laser welding.

In some embodiments, the repair system further includes a heating unit configured to at least partially melt the flexible metallic mesh prior to depositing the flexible metallic mesh on the surface of the machine. By at least partially melting the flexible metallic mesh prior to deposition on the surface of the machine, efficiency of the repair system may be increased. Further, time taken by the repair system for repairing the surface may also be reduced.

In some embodiments, the source of the flexible metallic mesh is a reel. The reel supplies the flexible metallic mesh to the delivery unit upon a rotation of the reel. The reel may facilitate uniform unrolling of the flexible metallic mesh.

According to a second aspect there is provided a method of in-situ repair of a machine. The method includes identifying a surface of the machine that needs to be repaired. The method further includes depositing, via a nozzle of a delivery unit, a flexible metallic mesh on the surface of the machine. The method further includes laser welding the flexible metallic mesh to the surface of the machine by emitting, via a laser unit, a laser beam and adjusting, via a galvanometer, the laser beam emitted by the laser unit to form a repair patch. The method of the second aspect may be implemented by the repair system of the first aspect of the present disclosure. The method may provide an easier, accurate and efficient way for in-situ repair of complex surfaces of the machine.

In some embodiments, the method further includes emitting, via a shielding unit, a shielding gas.

In some embodiments, the method further includes spraying, via a nozzle, the shielding gas on the surface of the machine.

In some embodiments, the method further includes receiving, via the nozzle, the flexible metallic mesh from the delivery unit. The method further includes depositing, via the nozzle, the flexible metallic mesh on the surface of the machine.

In some embodiments, the method further includes receiving the shielding gas from the shielding unit and the flexible metallic mesh within a duct. The method further includes receiving the flexible metallic mesh from the duct between a pair of rollers. The method further includes rotating, via a power source, the pair of rollers opposite to each other in order to deposit the flexible metallic mesh on the surface of the machine. The method further includes spraying, via a spray nozzle, the shielding gas on the surface of the machine. The nozzle is disposed in fluid communication with the duct.

In some embodiments, the method further includes receiving, via a delivery nozzle, the flexible metallic mesh from the delivery unit. The method further includes depositing, via the delivery nozzle, the flexible metallic mesh on the surface of the machine.

In some embodiments, the method further includes unwinding, via the delivery unit, a flexible metallic sheet from a reel. The method further includes laser cutting the flexible metallic sheet to form the flexible metallic mesh. Various shapes and dimensions of the flexible metallic sheet may be adapted to requirements of repairing operations.

In some embodiments, the method further includes coating, via a coating unit, the repair patch with one or more ceramic materials to form a thermal barrier repair patch.

In some embodiments, the method further includes performing, via a cleaning unit, at least one of cleaning, pre-machining, and degreasing the surface of the machine prior to depositing the flexible metallic mesh on the surface of the machine.

In some embodiments, the method further includes at least partially melting, via a heating unit, the flexible metallic mesh prior to depositing the flexible metallic mesh on the surface of the machine.

In some embodiments, the flexible metallic mesh includes a cubic boron nitride material, and/or a metallic superalloy comprising at least one of nickel, iron, cobalt, chromium, aluminium, and yttrium. The repair system may further allow a large variety of materials of the flexible metallic mesh for repairing the surface of the machine.

In some embodiments, a material of the flexible metallic mesh is the same as that of the surface of the machine.

In some embodiments, the flexible metallic mesh is an expanded metal mesh or a wire mesh. Both the expanded metal mesh and the wire mesh may be cheaper to produce, and easier to transport and handle.

Further, the repair system may allow the flexible metallic mesh to be applied either as a new coating that may be completely welded to the surface of the machine or as a metal patch that may be only welded to a periphery of a damaged portion of the surface of the machine.

In some embodiments, the machine is a gas turbine engine. In some embodiments, the method of in-situ repair may be implemented by the repair system for in-situ repair of the surface of the gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. The fan of a gas turbine may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

As used herein, the term "configured to" and like is at least as restrictive as the term "adapted to" and requires actual design intention to perform the specified function rather than mere physical capability of performing such a function.

As used herein, the term "communicably coupled to" refers to direct coupling between components and/or indirect coupling between components via one or more intervening components. Such components and intervening components may comprise, but are not limited to, junctions, communication paths, wireless networks, components, circuit elements, circuits, functional blocks, and/or devices. As an example of indirect coupling, a signal conveyed from a first component to a second component may be modified by one or more intervening components by modifying the form, nature, or format of information in a signal, while one or more elements of the information in the signal are nevertheless conveyed in a manner than can be recognized by the second component.

Figure 1:
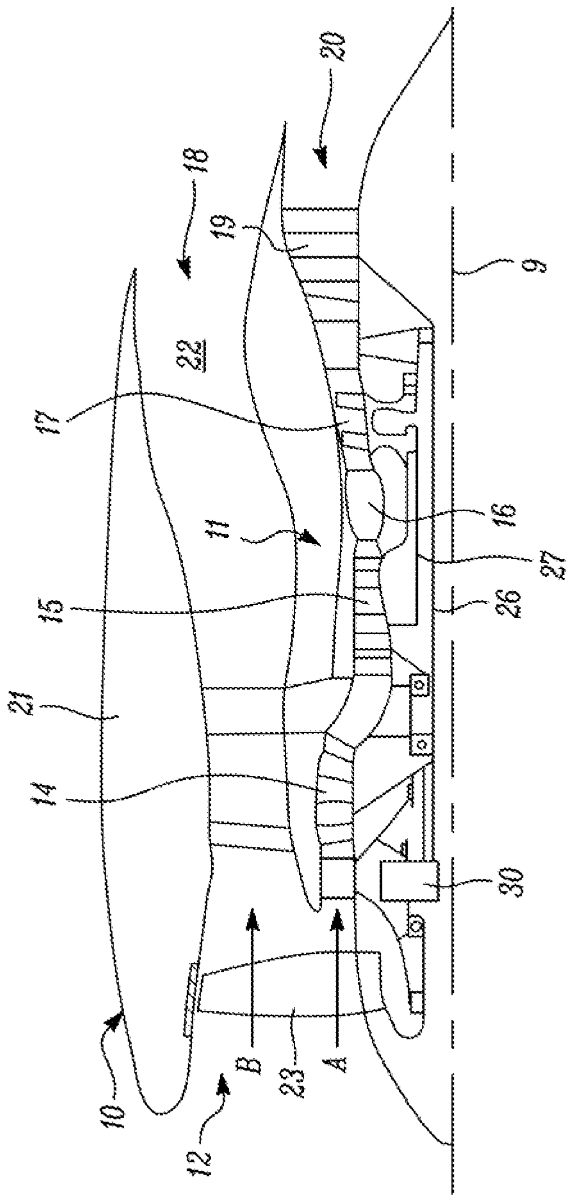
FIG. 1 is a schematic sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high-pressure compressor 15, combustion equipment 16, a high-pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
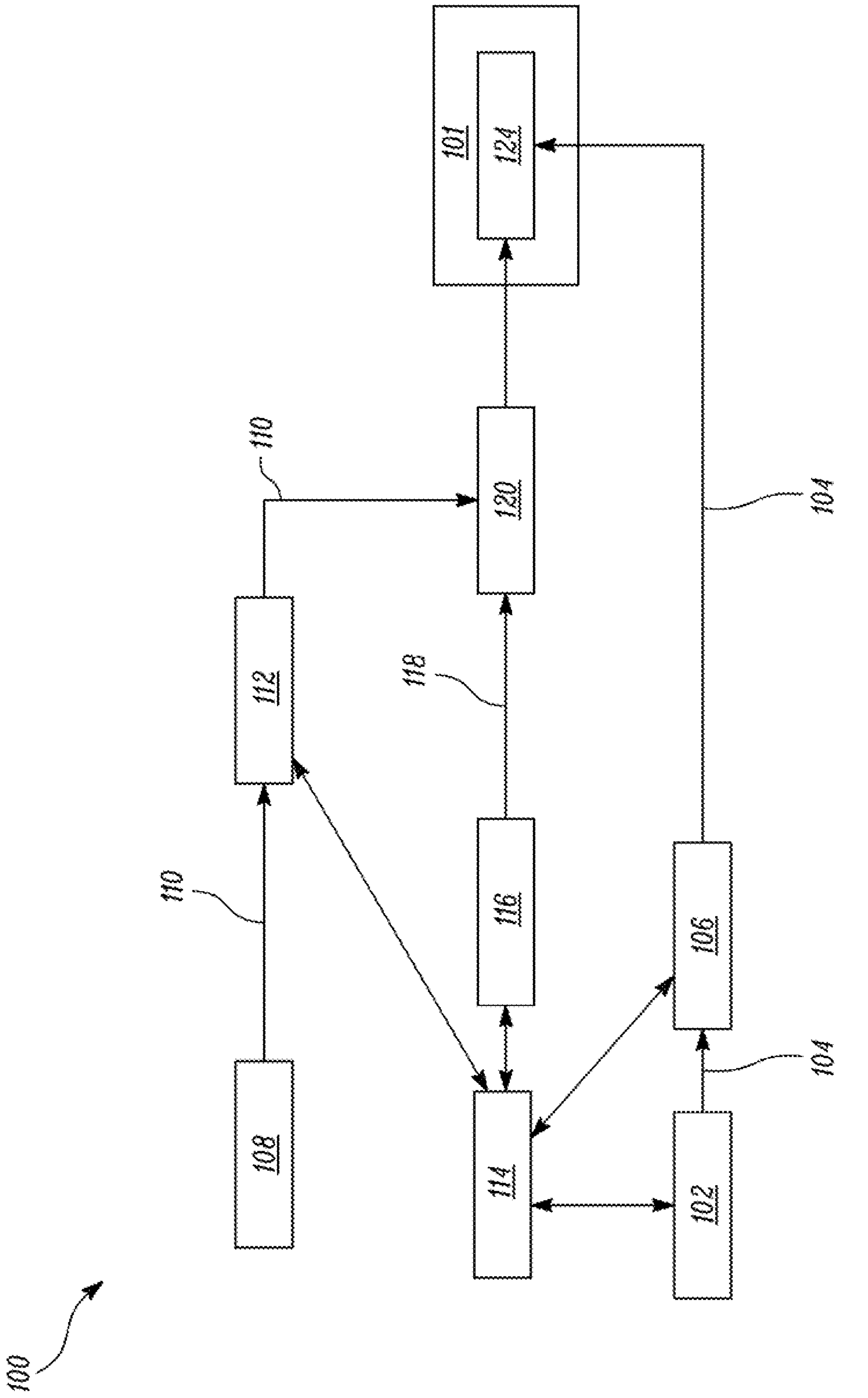
FIG. 2 is a block diagram illustrating a repair system for in-situ repair of a machine, according to an embodiment of the present disclosure.

FIG. 2 is a schematic block diagram illustrating a repair system 100 for in-situ repair of a machine 101. In some embodiments, the machine 101 is the gas turbine engine 10 (shown in FIG. 1). The repair system 100 includes a laser unit 102 configured to emit a laser beam 104. In some embodiments, the laser unit 102 includes solid-state lasers that use ytterbium oxide ($Yb_2O_3$) in disc form or as an internal coating in a fibre. In some embodiments, the laser unit 102 may include any other suitable laser, such as, for example, a feedback laser, a non-feedback laser, a $CO_2$ laser, or a green laser. In an example, the laser unit 102 may include an eximer laser (e.g., ArF, KrF, XeCl), or a semi-conductor-type laser (GaAs, GaAlAs). In some embodiments, the laser unit 102 may be disposed in a robotic arm. In some other embodiments, the laser unit 102 may be handheld.

The repair system 100 further includes a galvanometer 106 optically coupled to the laser unit 102 and configured to adjust the laser beam 104 received from the laser unit 102. The laser unit 102 may be compatible with the galvanometer 106. In some embodiments, the galvanometer 106 may be an electromechanical instrument that deflects the laser beam 104 by using one or more mirrors (not shown). In some cases, the galvanometer 106 may be used to direct a focal point of the laser beam 104 based on desired application attributes.

The repair system 100 further includes a source 108 of a flexible metallic mesh 110. The flexible metallic mesh 110 is an expanded metal mesh or a wire mesh, as described later in the description. The repair system 100 further includes a delivery unit 112 configured to receive the flexible metallic mesh 110 from the source 108 of the flexible metallic mesh 110. In other words, once the flexible metallic mesh 110 is dispensed by the source 108, the flexible metallic mesh 110 is received by the delivery unit 112.

In some embodiments, the flexible metallic mesh 110 includes a cubic boron nitride material, and/or a metallic superalloy comprising at least one of nickel, iron, cobalt, chromium, aluminium, and yttrium. In some other embodiments, a material of the flexible metallic mesh 110 is the same as that of a surface 124 of the machine 101 that needs to be repaired.

The repair system 100 further includes a controller 114 communicably coupled to the laser unit 102, the galvanometer 106, and the delivery unit 112. In some embodiments, the controller 114 may be embodied as a computing device. In some other embodiments, the controller 114 may embody an electronic control module that may be present onboard the machine 101.

The controller 114 may include one or more memories (not shown). The memories may include, for example, a flash memory, a random-access memory (RAM), and an electrically erasable programmable read-only memory (EEPROM). The memories may store data, such as, algorithms, instructions, and arithmetic operations. The controller 114 may execute various types of digitally stored instructions, such as, a software or an algorithm, retrieved from the memories, or a firmware program which may enable the controller 114 to perform a wide variety of operations.

The controller 114 may further include one or more processors (not shown). The one or more processors may be communicably coupled to the one or more memories. Further, the one or more processors may be communicably coupled to the laser unit 102, the galvanometer 106, and the delivery unit 112. The one or more processors may be any device that performs logic operations. It should be noted that the one or more processors may embody a single microprocessor or multiple microprocessors for receiving various input signals. Numerous commercially available microprocessors may be configured to perform the functions of the one or more processors. The one or more processors may further include a general processor, a central processing unit, an application specific integrated circuit (ASIC), a digital signal processor, a field programmable gate array (FPGA), a digital circuit, an analog circuit, any other type of processor, or any combination thereof. The one or more processors may include one or more components that may be operable to execute computer executable instructions or computer code that may be stored and retrieved from the one or more memories.

In the illustrated embodiment of FIG. 2, the repair system 100 further includes a shielding unit 116 configured to emit a shielding gas 118. Further, the controller 114 is communicably coupled to the shielding unit 116. The repair system 100 further includes a nozzle 120 disposed in fluid communication with at least the shielding unit 116. In the illustrated embodiment of FIG. 2, the nozzle 120 is further disposed in fluid communication with the delivery unit 112. In some embodiments, the shielding gas 118 may be argon or carbon dioxide. In some other embodiments, a selection of the shielding gas 118 is based on a type of material of the flexible metallic mesh 110 and the machine 101. In some embodiments, the repair system 100 may also be operable without using the shielding unit 116 and the shielding gas 118.

Figure 3:
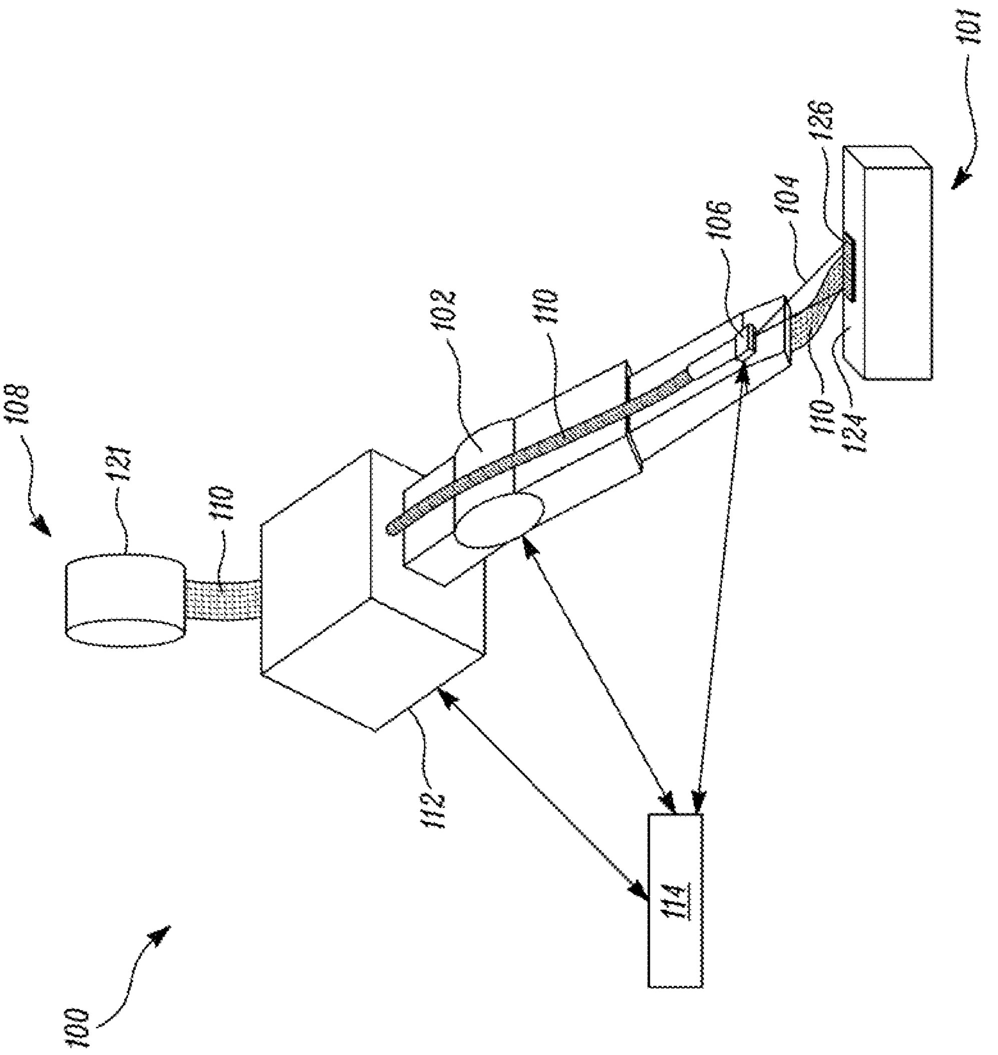
FIG. 3 is a schematic perspective view of the repair system of FIG. 2, with some components not shown.

FIG. 3 illustrates a schematic perspective view of the repair system 100, according to an embodiment of the present disclosure. In the illustrated embodiment of FIG. 3, some components of the repair system 100 (such as the shielding unit 116 and the nozzle 120) are not shown for illustrative purposes. Further, as illustrated in FIG. 3, the source 108 of the flexible metallic mesh 110 is a reel 121. The reel 121 supplies the flexible metallic mesh 110 to the delivery unit 112 upon a rotation of the reel 121. The delivery unit 112 receives the flexible metallic mesh 110 from the reel 121. Also, the reel 121 may facilitate uniform unrolling of the flexible metallic mesh 110.

In some embodiments, a skilled operator may identify and analyse the surface 124 of the machine 101 that needs to be repaired. Based on various characteristics of a damaged portion of the surface 124 that needs to be repaired, the skilled operator may decide a suitable repair option and pre-generate the computer executable instructions or the computer code that may be stored in the one or more memories of the controller 114. As mentioned above, the computer executable instructions or the computer code may also be retrieved from the one or more memories of the controller 114 for execution by the one or more processors of the controller 114.

Referring to FIGS. 2 and 3, the controller 114 (shown schematically in FIG. 3) is configured to control the delivery unit 112 to deposit the flexible metallic mesh 110 on the surface 124 of the machine 101. The controller 114 is further configured to control the laser unit 102 to emit the laser beam 104. The controller 114 is configured to control the galvanometer 106 to adjust the laser beam 104 in order to weld the flexible metallic mesh 110 to the surface 124 of the machine 101, thereby forming a repair patch 126. In other words, the controller 114 controls the galvanometer 106 to adjust an intensity and the focal point of the laser beam 104 so that the flexible metallic mesh 110 is laser welded to the surface 124 of the machine 101 to form the repair patch 126.

Further, the delivery unit 112 may allow deposition of the flexible metallic mesh 110 of any shape and size to repair the surface 124 of the machine 101. As the controller 114 is configured to control the galvanometer 106 to adjust various optical characteristics (focal point, trajectory, intensity) of the laser beam 104, a desirable repair patch (i.e., the repair patch 126) may be formed on the surface 124 of the machine 101 in accordance with different application requirements. Further, as the controller 114 is configured to control the laser unit 102 to emit the laser beam 104, the energy produced by the laser beam 104 to melt the surface 124 of the machine 101 and the flexible metallic mesh 110 may also be adjusted based on different application requirements.

In some embodiments, the controller 114 is further configured to control the shielding unit 116 in order to emit the shielding gas 118 from the shielding unit 116. Further, the nozzle 120 is configured to receive the shielding gas 118 from the shielding unit 116 and spray the shielding gas 118 on the surface 124 of the machine 101. In the illustrated embodiment of FIGS. 2 and 3, the nozzle 120 is further configured to receive the flexible metallic mesh 110 from the delivery unit 112 and deposit the flexible metallic mesh 110 on the surface 124 of the machine 101. It should be noted that only a portion of the machine 101 having the surface 124 is shown in FIG. 3. The repair patch 126 may also be formed on any other damaged surface of the machine 101.

Figure 4:
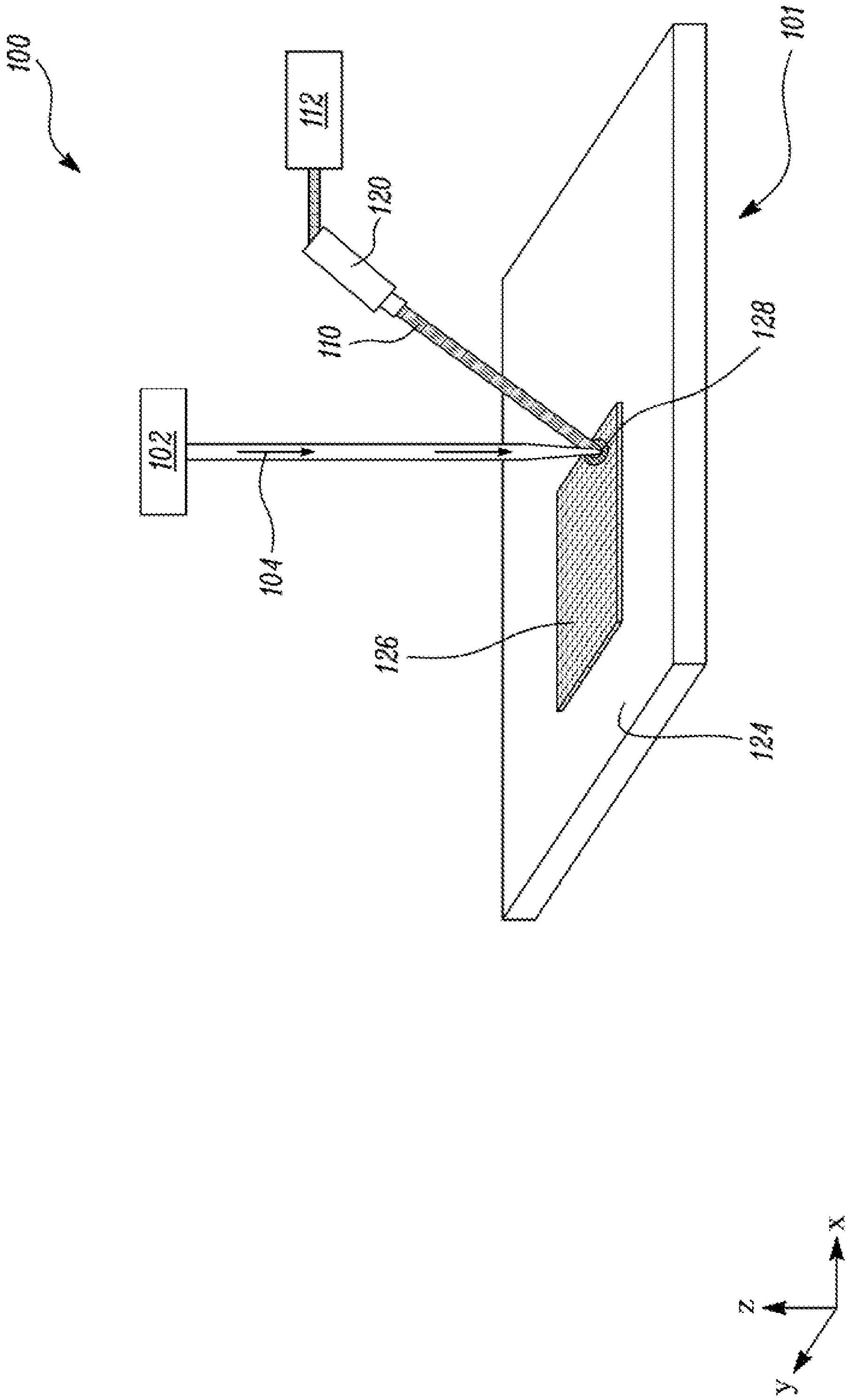
FIG. 4 is another schematic view of the repair system of FIG. 2, with some components not shown.

FIG. 4 illustrates a schematic view of the repair system 100 depicting formation of the repair patch 126 on the surface 124 of the machine 101, according to an embodiment of the present disclosure. Some components of the repair system 100, such as the galvanometer 106, the source 108 of the flexible metallic mesh 110, and the shielding unit 116 are not shown in FIG. 4 for illustrative purposes. The machine 101 defines mutually orthogonal x, y, and z-axes. The x and y-axes are in-plane axes of the machine 101, while the z-axis is a transverse axis disposed along a thickness of the machine 101. In other words, the x and y-axes are disposed along a plane parallel to the surface 124 of the machine 101, while the z-axis is perpendicular to the plane parallel to the surface 124 of the machine 101.

Referring to FIGS. 2 to 4, the nozzle 120 receives the flexible metallic mesh 110 from the delivery unit 112 and deposits the flexible metallic mesh 110 on the surface 124 along the x-axis. In other embodiments, the nozzle 120 may deposit the flexible metallic mesh 110 on the surface 124 along the y-axis. The nozzle 120 may be precisely positioned relative to the surface 124 of the machine 101, where the in-situ repair is needed, prior to depositing the flexible metallic mesh 110 on the surface 124. Once the flexible metallic mesh 110 is precisely deposited on the surface 124, the laser unit 102 emits the laser beam 104 to weld the flexible metallic mesh 110 to the surface 124. However, in some other embodiments, a path of the laser unit 102 may vary in the x-y plane based on application requirements. As shown in FIG. 4, the flexible metallic mesh 110 welded to the surface 124 forms the repair patch 126 on the surface 124 of the machine 101. Further, a melt pool 128 is also formed while welding the flexible metallic mesh 110 on the surface 124. In some embodiments, the laser unit 102 and the galvanometer 106 may be controlled to optimize the laser welding of the flexible metallic mesh 110 on the surface 124 to reduce heat distribution/discontinuation.

Further, the repair system 100 may control an energy produced by the laser unit 102, the intensity and trajectory of the laser beam 104, and the deposition of the flexible metallic mesh 110 based on application requirements. The intensity and trajectory of the laser beam 104 may be controlled by the galvanometer 106. The repair system 100 may also precisely control a size of the melt pool 128 generated during laser welding of the flexible metallic mesh 110 to the surface 124 of the machine 101. As the melt pool 128 is generated by the laser unit 102 and the galvanometer 106, the energy produced by the laser unit 102 to melt the surface 124 of the machine 101 and the flexible metallic mesh 110 may also be controlled. As a result, the laser unit 102 may control a grain orientation of a microstructure of a weld area proximal to the melt pool 128. Specifically, the laser unit 102 may be programmed to generate a large melt (larger than a diameter of the laser beam 104) at a very high temperature to achieve a columnar microstructure of materials of the machine 101 and the flexible metallic mesh 110, or at a lower temperature to achieve an equiaxed microstructure of the materials of the machine 101 and the flexible metallic mesh 110. Therefore, the repair system 100 of the present disclosure provides a fully customisable technique for complex in-situ repair operations of one or more damaged surfaces (e.g., the surface 124) of the machine 101.

In contrast to discontinuous feed of metallic powder in a conventional powder-based deposition process for in-situ repair of a component, the repair system 100 of the present disclosure provides continuous supply and deposition of the flexible metallic mesh 110 on the surface 124 of the machine 101. The continuous deposition of the flexible metallic mesh 110 on the surface 124 of the machine 101 may provide a relatively improved efficiency of the in-situ repair of the machine 101.

Furthermore, contrary to conventional techniques of in-situ repair, a wastage of the flexible metallic mesh 110 in the repair system 100 of the present disclosure may be reduced effectively or eliminated. Moreover, the repair system 100 using the flexible metallic mesh 110 may be relatively easier to design and use for in-situ repair of the machine 101.

Figure 5A:
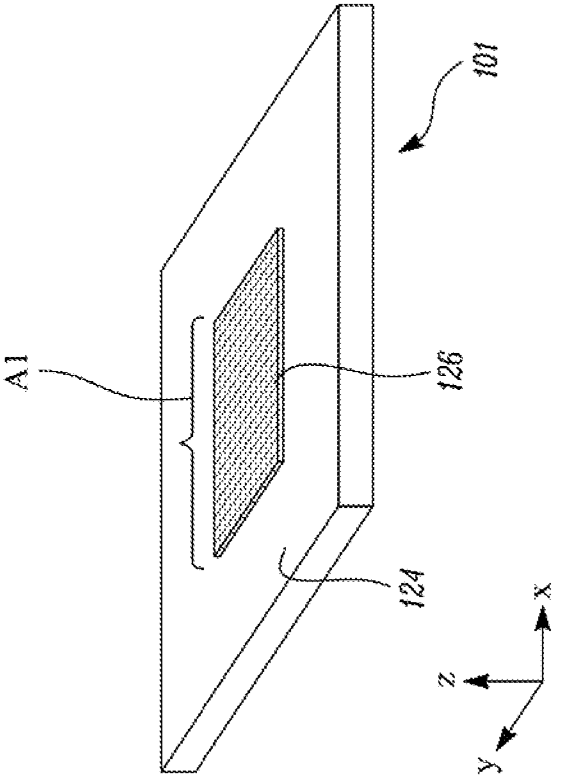
FIG. 5A is a schematic view of a repair patch formed by the repair system on a total area of a damaged portion of the surface of the machine.

FIG. 5A illustrates the repair patch 126 on the surface 124 of the machine 101, where the repair patch 126 is formed on a total area μl of a damaged portion of the surface 124 that needs to be repaired. Thus, in this case, the flexible metallic mesh 110 is laser welded to the surface 124 on the total area A1 of the damaged portion.

Figure 5B:
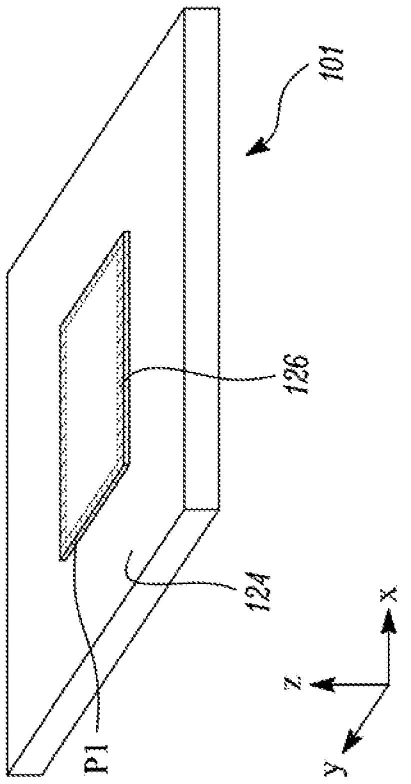
FIG. 5B is a schematic view of the repair patch formed by the repair system on a periphery of a damaged portion of the surface of the machine.

FIG. 5B illustrates the repair patch 126 on the surface 124 of the machine 101, where the repair patch 126 is formed on a periphery P1 of a damaged portion of the surface 124 that needs to be repaired. Thus, in this case, the flexible metallic mesh 110 is laser welded to the surface 124 on the periphery P1 of the damaged portion of the surface 124.

Figure 6B:
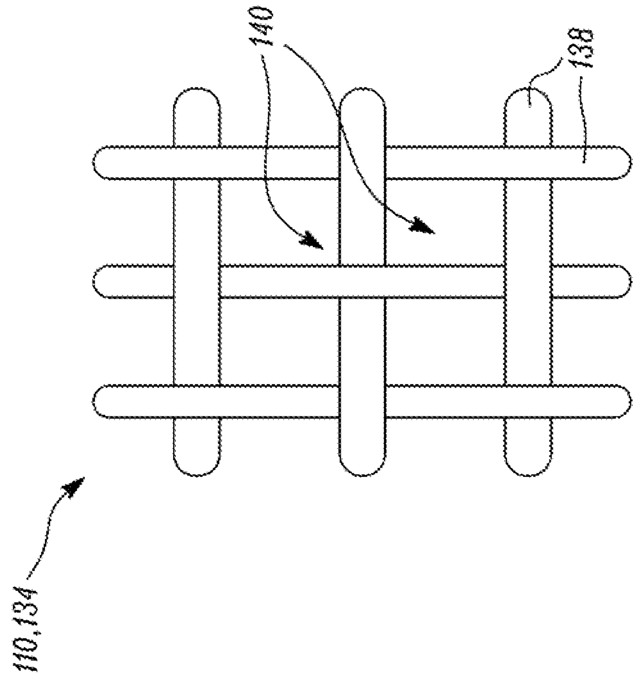
FIG. 6B is a schematic view of a flexible metallic mesh used by the repair system in the form of a wire mesh.
Figure 6A:
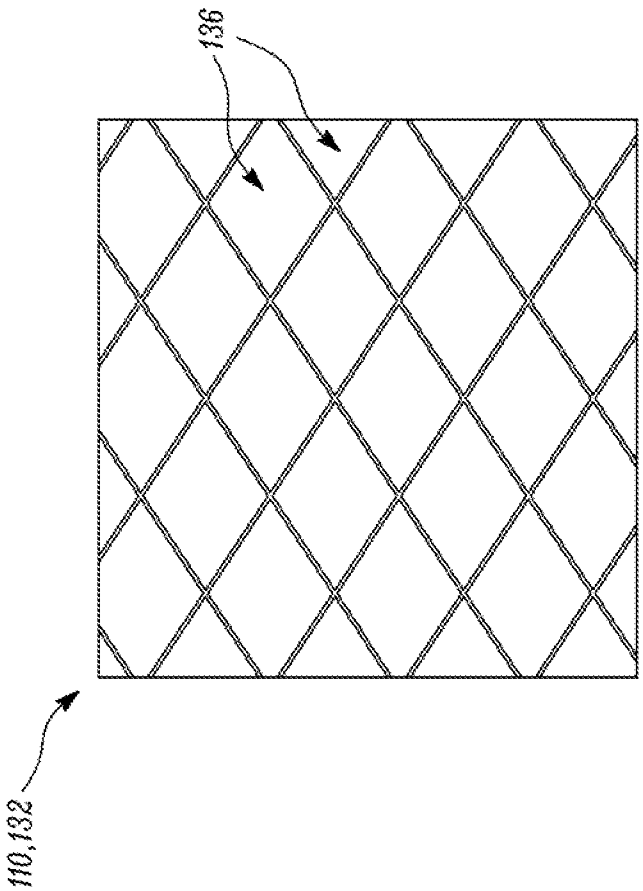
FIG. 6A is a schematic view of a flexible metallic mesh used by the repair system in the form of an expanded metal mesh.

FIGS. 6A and 6B illustrate schematic views of the flexible metallic mesh 110 in the form of an expanded metal mesh and a wire mesh respectively.

Figure 12B:
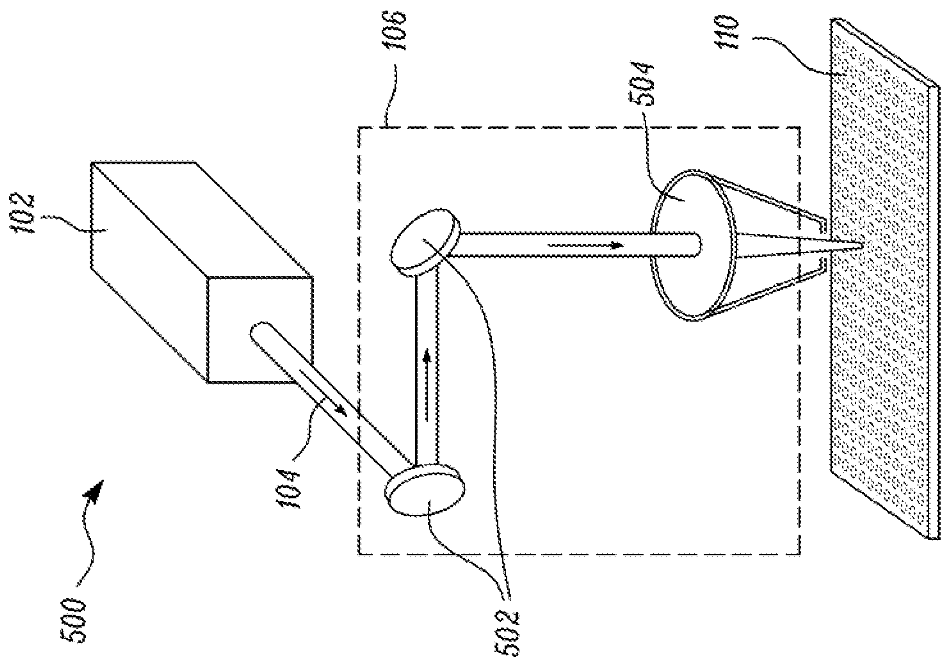
FIG. 12B is a schematic view of a laser welding apparatus for forming a flexible metallic mesh for use in the repair system of FIG. 2.
Figure 12A:
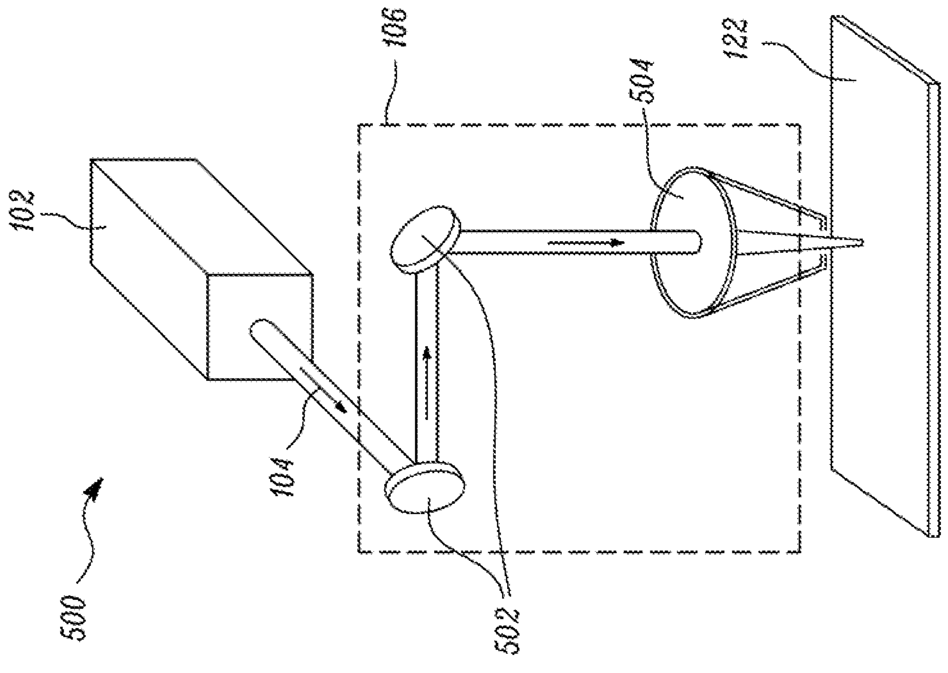
FIG. 12A is a schematic view of a laser welding apparatus for forming a flexible metallic mesh for use in the repair system of FIG. 2.

Referring to FIG. 6A, the flexible metallic mesh 110 is an expanded metal mesh 132 that may be formed by cutting a sheet of solid metal (e.g., a flexible metallic sheet 122 shown in FIG. 12A). The expanded metal mesh 132 has a criss-crossed shaped configuration. Further, the expanded metal mesh 132 includes a plurality of through-holes 136. Each of the plurality of through-holes 136 has a diamond shape. However, in some other embodiments, the plurality of through-holes 136 may have a circular, rectangular, triangular, or any other complex shape, as per application requirements. In some embodiments, the plurality of through-holes 136 may be formed by laser cutting a metal sheet.

Referring to FIG. 6B, the flexible metallic mesh 110 is a wire mesh 134. The wire mesh 134 may be a knitted wire mesh formed by knitting or welding a number of metallic wires 138 together. The wire mesh 134 may include any knitting pattern, as per application requirements. Further, the wire mesh 134 includes a plurality of through-apertures 140 having a rectangular shape. However, in some other embodiments, the plurality of through-apertures 140 may have a triangular, square, polygonal or any other complex shape, as per application requirements.

Figure 7:
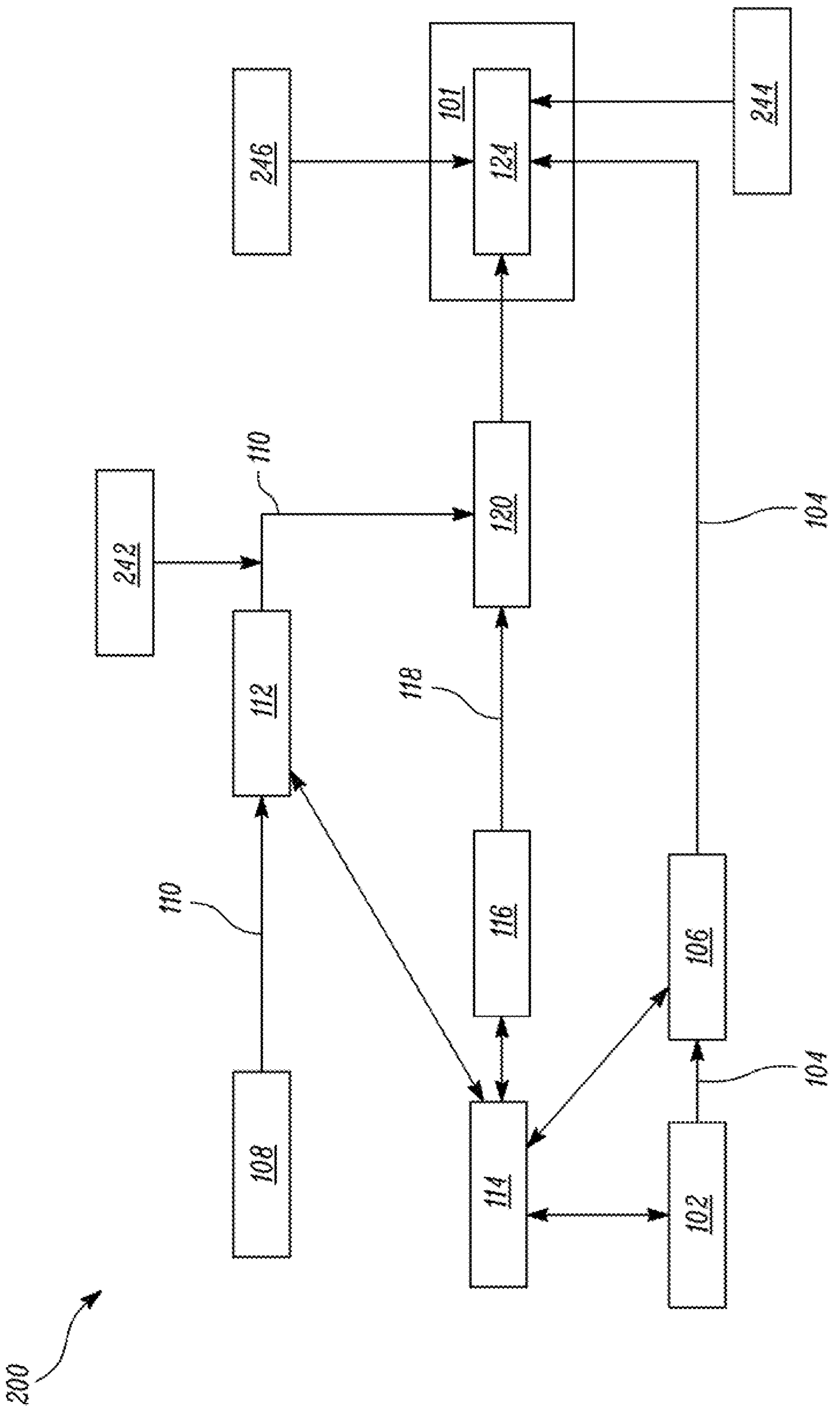
FIG. 7 is a block diagram of a repair system according to another embodiment.

FIG. 7 illustrates a block diagram of a repair system 200 according to another embodiment of the present disclosure. The repair system 200 is substantially similar to the repair system 100 of FIG. 1, with common components being referred to by the same reference numerals. However, the repair system 200 further includes a heating unit 242 configured to at least partially melt the flexible metallic mesh 110 prior to depositing the flexible metallic mesh 110 on the surface 124 of the machine 101. By at least partially melting the flexible metallic mesh 110 prior to deposition on the surface 124 of the machine 101, efficiency of the repair system 100 may be increased. Further, time taken by the repair system 100 for repairing the surface 124 may also be reduced. As shown in FIG. 7, the heating unit 242 is disposed between the delivery unit 112 and the nozzle 120. In some embodiments, the heating unit 242 may include a gas or electric heater, a heating coil, and any other device that provides heat to at least partially melt the flexible metallic mesh 110.

The repair system 200 further includes a cleaning unit 244 configured to perform at least one of cleaning, pre-machining, and degreasing of the surface 124 of the machine 101 prior to depositing the flexible metallic mesh 110 on the surface 124 of the machine 101. The cleaning unit 244 may include one or more fabrics and cleaning solutions for cleaning the surface 124 of the machine 101. In some cases, the cleaning unit 244 may also include a degreaser, such as volatile solvents, to remove oils and oil-borne soils from the surface 124 of the machine 101 that have been stamped, machined, welded, die-cast, etc. In some cases, the cleaning unit 244 may also include a precision grinding machine and a surface milling machine for pre-machining of the surface 124 of the machine 101. The cleaning unit 244 may facilitate in cleaning of the oxides and grease and removing the unwanted portions from the surface 124 of the machine 101 to improve a quality of laser welding.

The repair system 200 further includes a coating unit 246 configured to coat the repair patch 126 with one or more ceramic materials to form a thermal barrier repair patch (not shown). The coating unit 246 applies a ceramic coating to protect the repair patch 126 against any damage. The one or more ceramic materials may include oxides of aluminium, titanium, chromium, and zirconium based on application requirements.

Figure 8:
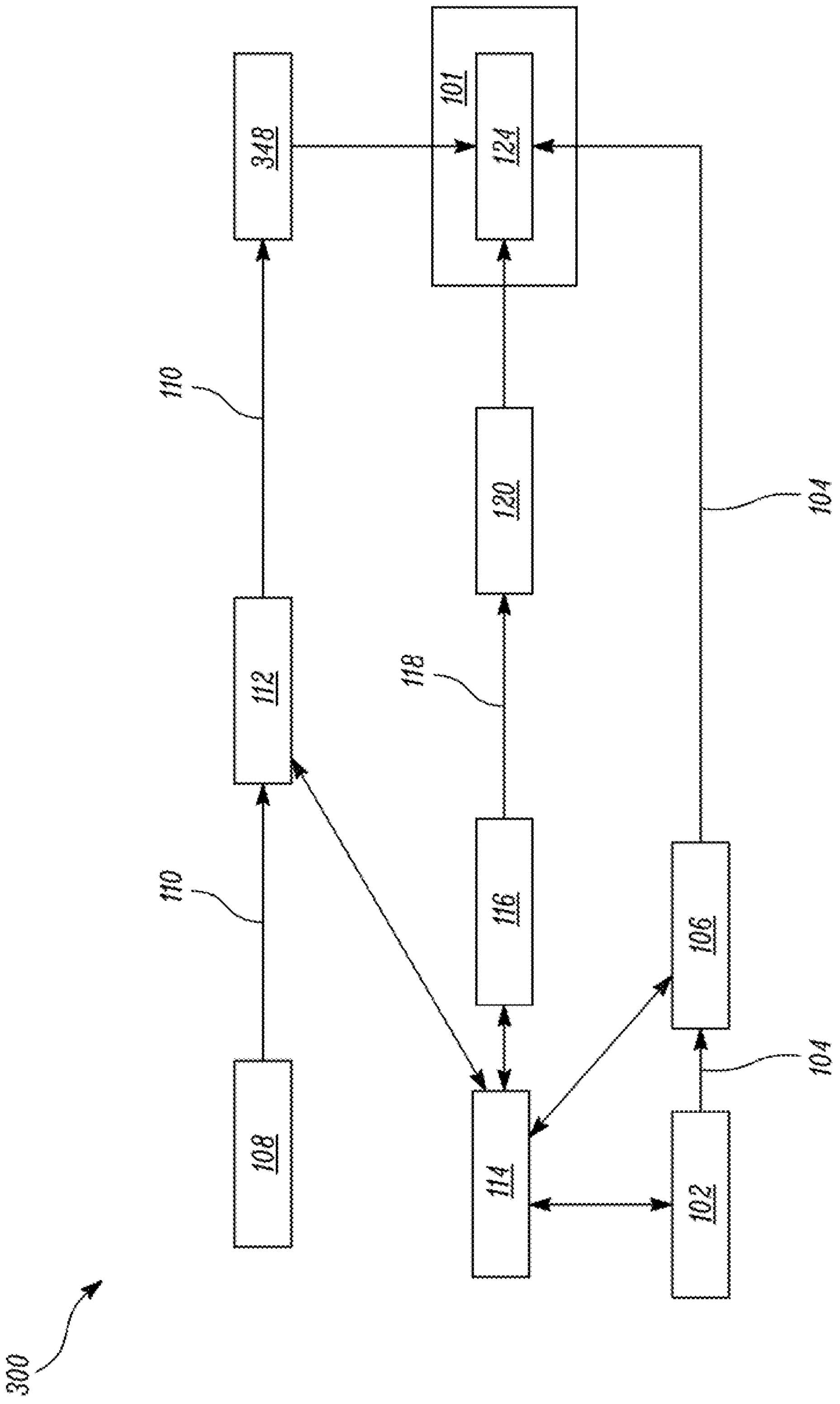
FIG. 8 is a block diagram of a repair system according to yet another embodiment.

FIG. 8 illustrates a block diagram of a repair system 300 according to yet another embodiment of the present disclosure. The repair system 300 is substantially similar to the repair system 100 of FIG. 1, with common components being referred to by the same reference numerals. However, in the repair system 300, it should be noted that the nozzle 120 is configured to only receive the shielding gas 118 from the shielding unit 116 and spray the shielding gas 118 on the surface 124 of the machine 101.

The repair system 300 further includes a delivery nozzle 348 disposed in fluid communication with the delivery unit 112. Further, the delivery nozzle 348 is configured to receive the flexible metallic mesh 110 from the delivery unit 112 and deposit the flexible metallic mesh 110 on the surface 124 of the machine 101.

Figure 9:
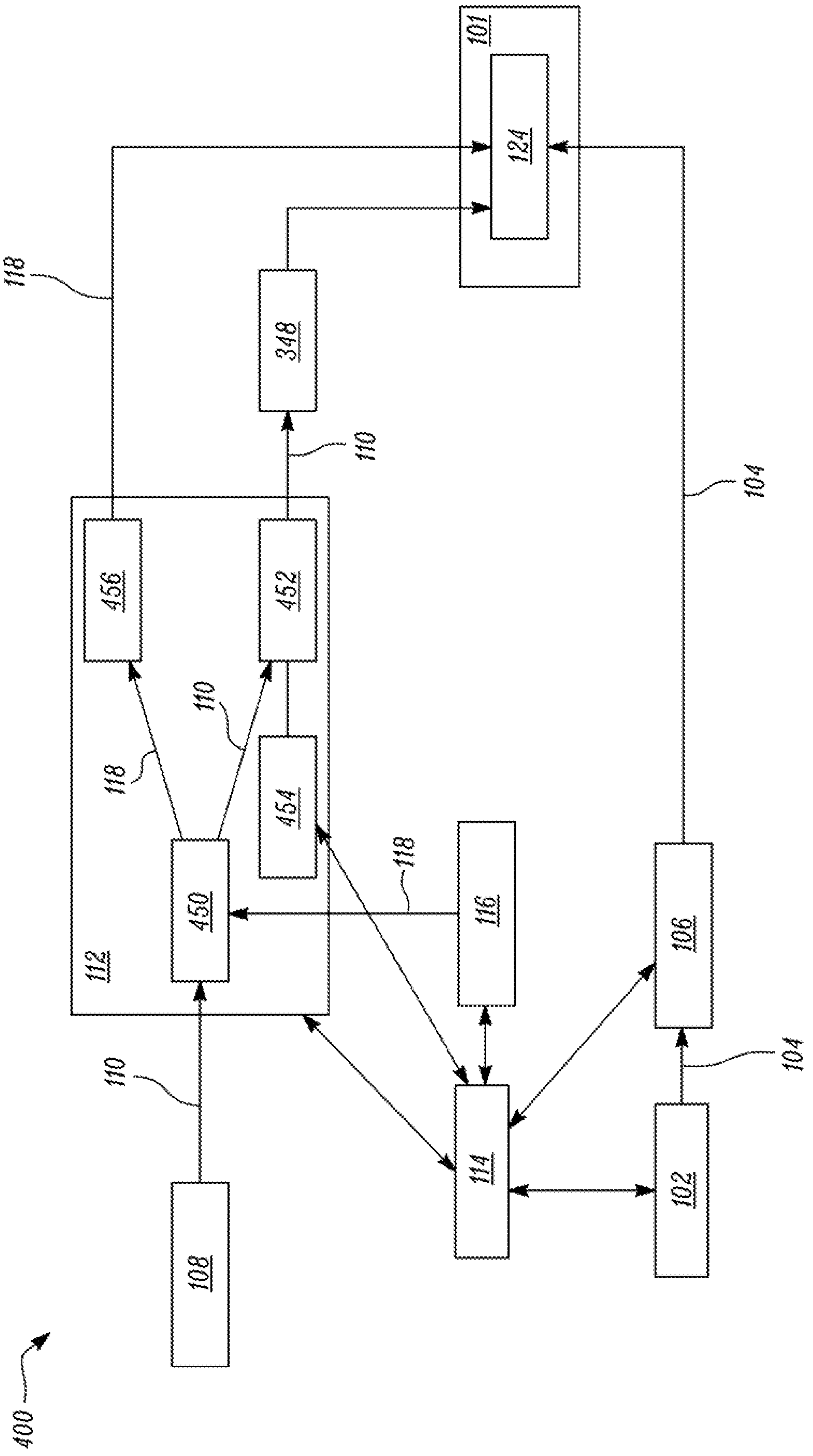
FIG. 9 is a block diagram of a repair system according to yet another embodiment.

FIG. 9 illustrates a block diagram of a repair system 400 according to yet another embodiment of the present disclosure. The repair system 400 is substantially similar to the repair system 300 of FIG. 8, with common components being referred to by the same reference numerals. However, in the repair system 400, the delivery unit 112 includes a duct 450, a pair of rollers 452, a power source 454 drivably coupled to the pair of rollers 452 and communicably coupled to the controller 114, and a spray nozzle 456.

Figure 10:
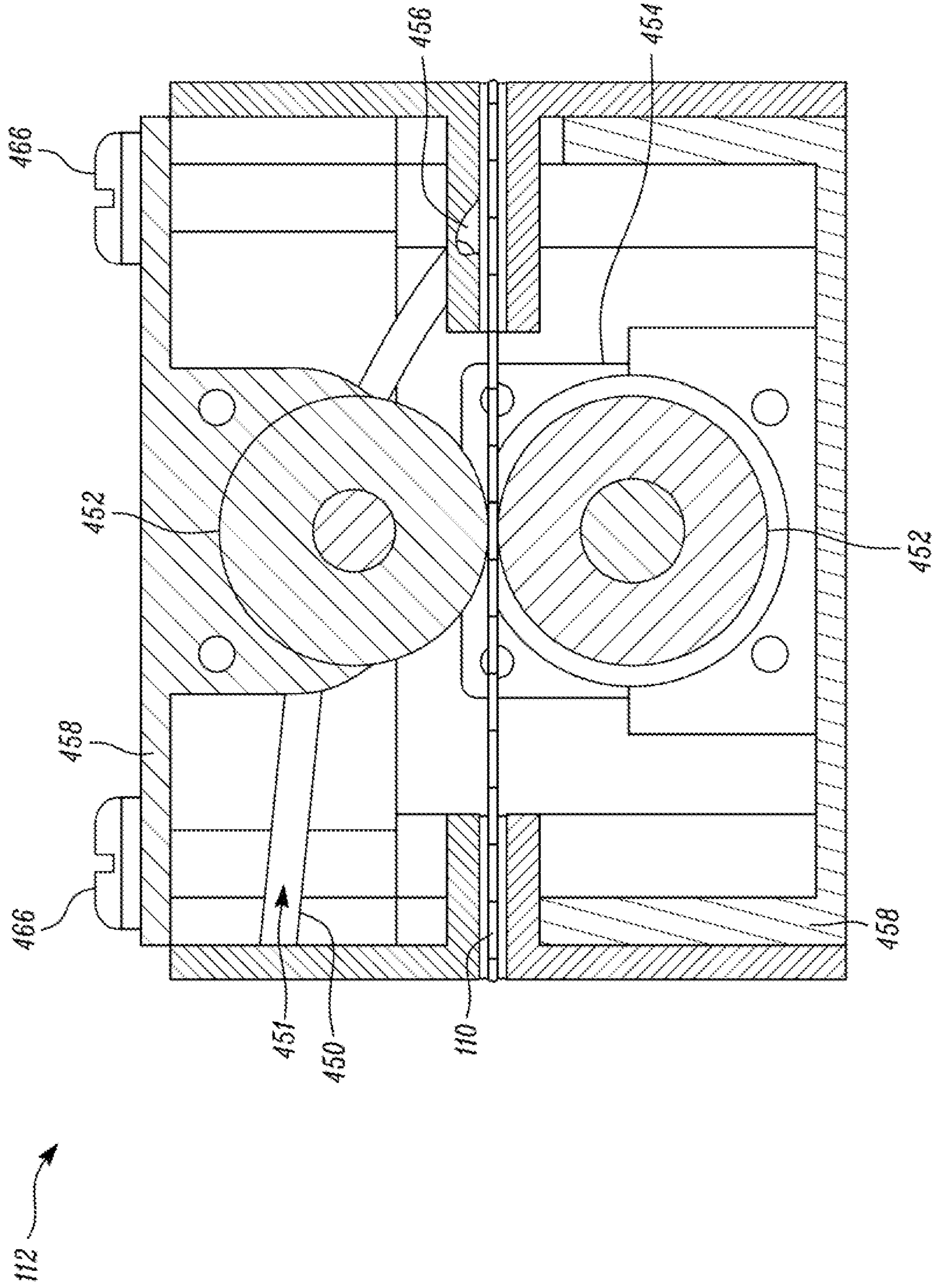
FIG. 10 is a schematic sectional view of a delivery unit of the repair system of FIG. 9.

FIG. 10 illustrates a sectional schematic side view of the delivery unit 112 illustrated in FIG. 9, according to an embodiment of the present disclosure.

Figure 11:
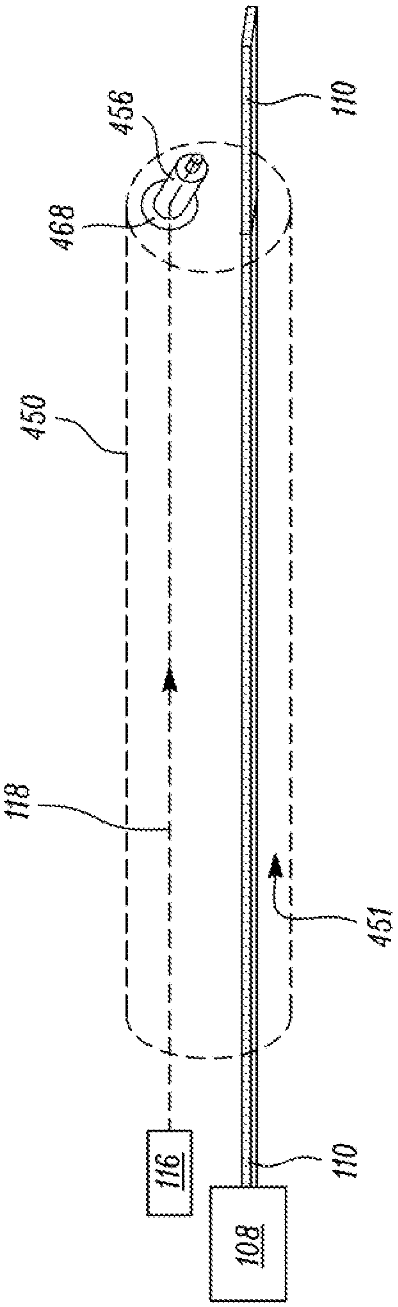
FIG. 11 is a schematic view of a duct of the delivery unit of FIG. 10.

FIG. 11 illustrates a detailed view of the duct 450 of the delivery unit 112 of FIG. 10.

Referring to FIGS. 9 to 11, the duct 450 includes a passage 451 disposed in fluid communication with the shielding unit 116 and the source 108 of the flexible metallic mesh 110. The duct 450 is configured to receive therein the shielding gas 118 from the shielding unit 116 and the flexible metallic mesh 110 from the source 108 of the flexible metallic mesh 110. The pair of rollers 452 is configured to receive therebetween the flexible metallic mesh 110 from the duct 450. The pair of rollers 452 is configured to rotate opposite to each other to deposit the flexible metallic mesh 110 on the surface 124 of the machine 101.

The power source 454 is configured to rotate the pair of rollers 452. Further, the controller 114 is configured to control the power source 454 in order to rotate the pair of rollers 452 opposite to each other. The power source 454 may include a motor. The spray nozzle 456 (instead of the nozzle 120 of FIG. 2) is disposed in fluid communication with the duct 450 and configured to spray the shielding gas 118 on the surface 124 of the machine 101. Further, a seal 468 (schematically shown in FIG. 11) is disposed between the spray nozzle 456 and the duct 450 to prevent any leakage of the shielding gas 118 before reaching the spray nozzle 456.

The delivery unit 112 further includes a pair of clamping members 458 (shown in FIG. 10). Each of the pair of clamping members 458 is coupled to a corresponding roller 452 from the pair of rollers 452. The delivery unit 112 further includes one or more fasteners 466 connecting the pair of clamping members 458 to each other. The one or more fasteners 466 may include any mechanical fasteners such as screws, bolts, or dowels. The one or more fasteners 466 are configured to adjust a force applied by the pair of rollers 452 on the flexible metallic mesh 110. Each of the duct 450 and the spray nozzle 456 is at least partially received within one of the pair of clamping members 458. As the spray nozzle 456 (i.e., for spraying the shielding gas 118) is a part of the delivery unit 112, the repair system 400 may have a compact design. As a result, there may be minimal constraints related to space requirements in the repair system 400.

As already mentioned above, the delivery nozzle 348 (shown in FIG. 9) is configured to receive the flexible metallic mesh 110 from the delivery unit 112. Specifically, the delivery nozzle 348 is configured to receive the flexible metallic mesh 110 from the pair of rollers 452.

FIGS. 12A and 12B illustrate schematic views of a laser welding apparatus 500 for forming the flexible metallic mesh 110 for use in the repair systems 100, 200, 300, 400 (shown in FIGS. 2, 7, 8, and 9). The laser welding apparatus 500 includes the laser unit 102 configured to emit the laser beam 104. The laser welding apparatus 500 also includes the galvanometer 106. The galvanometer 106 includes one or more mirrors 502 configured to reflect the laser beam 104 and adjust a direction of the laser beam 104. In the illustrative embodiments of FIGS. 12A and 12B, the galvanometer 106 includes two mirrors 502. However, in some other embodiments, the galvanometer 106 may include any number of the mirrors 502, based on the application requirements. The galvanometer 106 also includes a focusing lens 504 configured to adjust the intensity and the focal point of the laser beam 104. The laser beam 104 is emitted on a flexible metallic sheet 122 to generate a plurality of through-holes (e.g., such as the plurality of through-holes 136, shown in FIG. 6A) and form the flexible metallic mesh 110. Therefore, the flexible metallic mesh 110 is formed by laser cutting the flexible metallic sheet 122.

Figure 13:
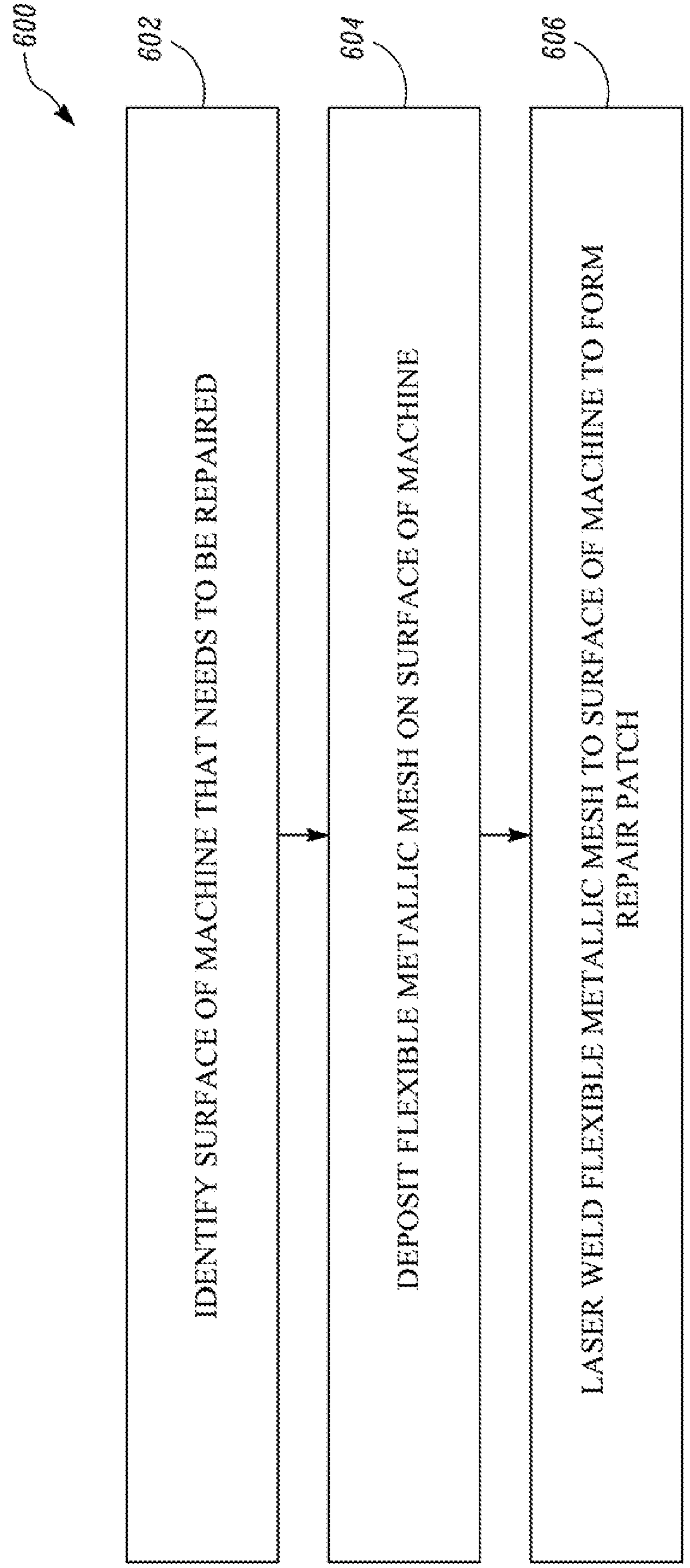
FIG. 13 is a flowchart illustrating a method of in-situ repair of the machine of the present disclosure.

FIG. 13 is a flowchart illustrating a method 600 for in-situ repair a machine e.g. of the machine 101 of FIG. 2, which may also be the gas turbine engine 10 of FIG. 1. The method 600 may be implemented by the repair system 100, 200, 300, 400 of FIGS. 2, 7, 8, and 9, respectively.

Referring to FIGS. 2, 3, and 7 to 13, at step 602, the method 600 includes identifying the surface 124 of the machine 101 that needs to be repaired. At step 604, the method 600 further includes depositing, via the delivery unit 112, the flexible metallic mesh 110 on the surface 124 of the machine 101.

At step 606, the method 600 further includes laser welding the flexible metallic mesh 110 to the surface 124 of the machine 101 to form the repair patch 126. Laser welding the flexible metallic mesh 110 includes emitting, via the laser unit 102, the laser beam 104 and adjusting, via the galvanometer 106, the laser beam 104 emitted by the laser unit 102.

In some embodiments, prior to depositing the flexible metallic mesh 110 on the surface 124 of the machine 101, the method 600 further includes unwinding, via the delivery unit 112, the flexible metallic sheet 122 (shown in FIG. 12A) from a reel (such as the reel 121 shown in FIG. 3). The method 600 further includes laser cutting the flexible metal sheet 122 to form the flexible metallic mesh 110.

Referring to FIGS. 2, 7, 8 and 13, in some embodiments, the method 600 further includes emitting, via the shielding unit 116, the shielding gas 118. In some embodiments, the method 600 further includes spraying, via the nozzle 120, the shielding gas 118 on the surface 124 of the machine 101.

Referring to FIGS. 2, 7, and 13, the method 600 further includes receiving, via the nozzle 120, the flexible metallic mesh 110 from the delivery unit 112. The method 600 further includes depositing, via the nozzle 120, the flexible metallic mesh 110 on the surface 124 of the machine 101.

Referring to FIGS. 8, 9, and 13, the method 600 further includes receiving, via the delivery nozzle 348, the flexible metallic mesh 110 from the delivery unit 112. The method 600 further includes depositing, via the delivery nozzle 348, the flexible metallic mesh 110 on the surface 124 of the machine 101.

Referring to FIGS. 9, 10, 11, and 13, in some embodiments, the method 600 further includes receiving the shielding gas 118 from the shielding unit 116 and the flexible metallic mesh 110 within the duct 450. The method 600 further includes receiving the flexible metallic mesh 110 from the duct 450 between the pair of rollers 452. The method 600 further includes rotating, via the power source 454, the pair of rollers 452 opposite to each other in order to deposit the flexible metallic mesh 110 on the surface 124 of the machine 101. The method 600 further includes spraying, via the spray nozzle 456, the shielding gas 118 on the surface 124 of the machine 101. The spray nozzle 456 is disposed in fluid communication with the duct 450.

Referring to FIGS. 7 and 13, the method 600 further includes coating, via the coating unit 246, the repair patch 126 with the one or more ceramic materials to form the thermal barrier repair patch. The method 600 further includes performing, via the cleaning unit 244, at least one of cleaning, pre-machining, and degreasing the surface 124 of the machine 101 prior to depositing the flexible metallic mesh 110 on the surface 124 of the machine 101. The method 600 further includes at least partially melting, via the heating unit 242, the flexible metallic mesh 110 prior to depositing the flexible metallic mesh 110 on the surface 124 of the machine 101.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A repair system for in-situ repair of a machine, the repair system comprising:

a laser unit configured to emit a laser beam;

a galvanometer optically coupled to the laser unit and configured to adjust the laser beam received from the laser unit;

a source of a flexible metallic mesh;

a shielding unit configured to emit a shielding gas;

a delivery unit configured to receive the flexible metallic mesh from the source of the flexible metallic mesh, the delivery unit comprising:

a duct comprising a passage disposed in fluid communication with the shielding unit and the source of the flexible metallic mesh, wherein the duct is configured to receive therein the shielding gas from the shielding unit and the flexible metallic mesh from the source of the flexible metallic mesh;

a pair of rollers configured to receive therebetween the flexible metallic mesh from the duct, wherein the pair of rollers is configured to rotate opposite to each other to deposit the flexible metallic mesh on a surface of the machine;

a power source drivably coupled to the pair of rollers and communicably coupled to a controller, wherein the power source is configured to rotate the pair of rollers, and wherein the controller is configured to control the power source in order to rotate the pair of rollers opposite to each other; and a spray nozzle disposed in fluid communication with the duct and configured to spray the shielding gas on the surface of the machine;

a delivery nozzle disposed in fluid communication with the delivery unit, wherein the delivery nozzle is configured to receive the flexible metallic mesh from the delivery unit and deposit the flexible metallic mesh on the surface of the machine; and the controller communicably coupled to the laser unit, the galvanometer, and the delivery unit, wherein the controller is configured to:

control the delivery unit to deposit the flexible metallic mesh on the surface of the machine;

control the laser unit to emit the laser beam; and control the galvanometer to adjust the laser beam in order to weld the flexible metallic mesh to the surface of the machine, thereby forming a repair patch.

2. The repair system of claim 1, wherein the delivery unit further comprises:

a pair of clamping members, each of the pair of clamping members coupled to a corresponding roller from the pair of rollers; and one or more fasteners connecting the pair of clamping members to each other, wherein the one or more fasteners are configured to adjust a force applied by the pair of rollers on the flexible metallic mesh;

wherein each of the duct and the spray nozzle is at least partially received within one of the pair of clamping members.

3. The repair system of claim 1, wherein the controller is communicably coupled to the shielding unit, and wherein the controller is further configured to control the shielding unit in order to emit the shielding gas from the shielding unit.

4. The repair system of claim 1, further comprising a coating unit configured to coat the repair patch with one or more ceramic materials to form a thermal barrier repair patch.

5. The repair system of claim 1, further comprising a cleaning unit configured to perform at least one of cleaning, pre-machining, and degreasing of the surface of the machine prior to depositing the flexible metallic mesh on the surface of the machine.

6. The repair system of claim 1, further comprising a heating unit configured to at least partially melt the flexible metallic mesh prior to depositing the flexible metallic mesh on the surface of the machine.

7. The repair system of claim 1, wherein the source of the flexible metallic mesh is a reel, and wherein the reel supplies the flexible metallic mesh to the delivery unit upon a rotation of the reel.

8. The repair system of claim 1, wherein the machine is a gas turbine machine.

9. A method of in-situ repair of a machine, the method comprising the steps of:

identifying a surface of the machine that needs to be repaired;

providing a flexible metallic mesh to a delivery unit;

emitting, via a shielding unit, a shielding gas;

receiving the shielding gas from the shielding unit and the flexible metallic mesh within a duct;

receiving the flexible metallic mesh from the duct between a pair of rollers;

rotating, via a power source, the pair of rollers opposite to each other in order to deposit the flexible metallic mesh on the surface of the machine; and spraying, via a spray nozzle, the shielding gas on the surface of the machine, wherein the spray nozzle is disposed in fluid communication with the duct;

receiving, via a delivery nozzle, the flexible metallic mesh from the delivery unit; and depositing, via the delivery nozzle, the flexible metallic mesh on the surface of the machine; and laser welding the flexible metallic mesh to the surface of the machine by:

emitting, via a laser unit, a laser beam; and adjusting, via a galvanometer, the laser beam emitted by the laser unit to form a repair patch.

10. The method of claim 9, further comprising: unwinding, via the delivery unit, a flexible metallic sheet from a reel; and laser cutting the flexible metallic sheet to form the flexible metallic mesh.

* * * * *